United States Patent [19]

Sedillo et al.

[11] Patent Number: 4,659,750

[45] Date of Patent: Apr. 21, 1987

[54] FLUID LOSS CONTROL IN OIL FIELD CEMENTS

[75] Inventors: Lawrence P. Sedillo, Houston; John C. Newlove, Kingwood; Robert C. Portnoy, Houston, all of Tex.

[73] Assignee: Exxon Chemical Patents Inc., Linden, N.J.

[21] Appl. No.: 741,079

[22] Filed: Jun. 4, 1985

[51] Int. Cl.$^4$ ................................................. C09K 7/00
[52] U.S. Cl. ........................................ 523/130; 106/90
[58] Field of Search ............................. 523/130; 106/90

[56] References Cited

U.S. PATENT DOCUMENTS

| | | | |
|---|---|---|---|
| 3,359,225 | 12/1967 | Weisend | 524/2 |
| 4,258,790 | 3/1981 | Hale | 166/293 |
| 4,480,693 | 11/1984 | Newlove | 166/293 |

*Primary Examiner*—Paul R. Michl
*Assistant Examiner*—Alex H. Walker
*Attorney, Agent, or Firm*—R. A. Dexter; R. L. Graham

[57] ABSTRACT

An aqueous slurry which comprises (a) a cement; (b) about 0.05 to 5.0 wt. % of a copolymer of N-vinylpyrrolidone and a salt of styrenesulfonic acid based on the dry weight of said cement; (c) about 0.05 to 5.0 wt. % of a formaldehyde condensed naphthalene-sulfonic acid salt based on the dry weight of said cement; and (d) water, said cement, said copolymer and said dispersant being dispersed in said water to form said aqueous slurry.

5 Claims, No Drawings

FLUID LOSS CONTROL IN OIL FIELD CEMENTS

FIELD OF THE INVENTION

The present invention relates to materials which reduce the filtration of fluid into permeable earth formations during cementing processes in the drilling and completing of subterranean wells, particularly wells for the recovery of petroleum resources.

BACKGROUND OF THE INVENTION

Petroleum well cementing is the process of mixing a slurry of cement, water, and other additives and pumping it down through steel casing to critical points in the oil well annulus around the casing or in the open hole below the casing string. The primary functions of the cementing process are to restrict fluid movement between geological formations and to bond and support the casing. In addition, the cement aids in protecting the casing from corrosion, preventing blowouts by quickly sealing formations, protecting the casing from shock loads in drilling deeper wells, and sealing off lost circulation or thief zones.

A common problem in petroleum well cementing is the flow of liquid from the cement slurry into porous earth formations in contact with the cement. This fluid loss is undesirable since it can result in dehydration of the cement slurry, and it causes thick filter cakes of cement solids which can plug the well bore. The fluid loss can damage sensitive formations. Cement fluid loss is particularly a problem in the process known as squeeze cementing.

There is a requirement, therefore, for materials which, when added to the cement formulation, reduce the loss of fluid from the slurry to porous formations.

A type of fluid loss agent used in oil well cementing consists of a medium molecular weight grade of hydroxyethylcellulose (HEC) which may be employed with or without a dispersant such as condensed naphthalenesulfonic acid salts. There are several disadvantages to the use of hydroxyethylcellulose as a cement fluid loss control agent. Among these disadvantages are its properties of causing undesirable viscosification and retardation of the cement and losing effectiveness in the presence of soluble calcium salts and at elevated temperatures.

Another cement additive employed for control of fluid loss is a copolymer of acrylamide and acrylic acid (L. F. McKenzie et al, SPE 1-623,279 [1982]). Although this material performs well at high temperatures and in the presence of soluble calcium salts, it has the undesirable property of strongly retarding cement. This retarding effect increases with increasing temperature, most likely due to the hydrolysis of the unstable amide groups contained in the polymer which hydrolysis accelerates at elevated temperature. Such hydrolysis of the amide moieties produces additional carboxylic acid residues which are credited with cement retarding activity.

Still other materials utilized for the control of fluid loss during well cementing are combinations of polyamines and either lignosulfonate or condensed naphthalenesulfonic acid salts (L. F. McKenzie et al, Oil and Gas J. 80 [13] 146 [1982]). These additive combinations are valuable since they cause little viscosification of the cement, and have little sensitivity to dissolved calcium and moderately high temperatures. The utility of the polyamine sulfonate combination is somewhat limited, however, by two side effects they produce: retardation and settlement (free water) of the cement.

Mixtures of HEC, poly(vinylpyrrolidone) and sodium naphthalenesulfonate have been reported as cement fluid loss additives (Wersent, U.S. Pat. No. 3,132,693) as have mixtures of poly(vinylpyrrolidone) and sodium naphthalenesulfonate-formaldehyde condensation products (U.S. Pat. No. 3,359,225).

A fluid loss control agent in oil field cements is disclosed to be a mixture of a copolymer of N-vinylpyrrolidone and a salt of styrenesulfonic acid in U.S. Pat. No. 4,480,693.

Also complex mixtures of maleic anhydride N-vinylpyrrolidone copolymers with polymers of poly(arylvinylbenzyl) alkyl and hydroxyalkyl substituted quaternary ammonium bases and salts have been used (Wahl, U.S. Pat. No. 3,140,269).

An improved fluid loss additive mixture for well cements consists of 30 to 70 weight percent of N-vinylpyrrolidone homopolymer, from about 5 to 19 weight percent of carboxylmethylhydroxyethylcellulose, and the sodium salt of condensed naphthalenesulfonic acid. (B. W. Hale, U.S. Pat. No. 4,258,790).

Copolymers of N-vinylpyrrolidone and metal salts of styrenesulfonic acid are known, but only as components in oil containing microcapsules used in films (K. Saeki et al, U.S. Pat. No. 3,855,146).

Despite the art for the control of cement fluid loss which is already known, there exists a need for novel agents capable of improving fluid loss control which are not reduced in utility by the limitations described above.

SUMMARY OF THE INVENTION

The present invention discloses cementing formulations which comprise: (a) water; (b) a hydraulic cement; (c) from 0.05 to 5.0 wt% based on the weight of the dry cement of a copolymer of N-vinylpyrrolidone and a metal, preferably sodium, salt of styrenesulfonic acid, said copolymer ranging in composition from 5 to 95 mole % vinylpyrrolidone and in reduced viscosity in 2% NaCl at 0.5 wt% from 0.5 to 15 dl/g; and (d) from 0.05 to 5.0 wt% based on the weight of dry cement of a cement dispersant composed of the free acid form and metal salts therefrom of formaldehyde condensed naphthalenesulfonic acid.

This provides a method for the control of fluid loss to permeable earth formations from formulations for the cementing of subterranean wells, particularly wells from which are produced natural petroleum.

GENERAL DESCRIPTION OF THE INVENTION

The present invention relates to fluid loss control mixtures of copolymers of N-vinylpyrrolidone and metal salts of styrenesulfonic acid and dispersants such as condensed naphthalenesulfonic acid salts and to the use of the mixture as agents for the control of fluid loss to permeable earth formations from formulations used for cementing subterranean wells, particularly those wells from which natural petroleum resources are produced.

The polymers useful in this invention are copolymers of N-vinylpyrrolidone and metal salts of styrenesulfonic acid. These copolymers are prepared by free radical copolymerization in aqueous solution at 40°-60° C. Typical free radical initiators for the polymerization are azoisobutyronitrile (AIBN), potassium peroxydisulfate, and the like. The copolymers consist of from 5-95 mole % of N-vinylpyrrolidone and 95-5 mole % of a salt of styrenesulfonic acid. Preferred for their better performance as cement fluid loss control agents are the copolymers consisting of 90-35 mole % of N-vinylpyrrolidone and 10-65 mole % of sodium styrenesulfonate.

The cation of the styrenesulfonic acid salt may be any cation which provides a water soluble salt in combination with the styrenesulfonate anion and which causes no undesirable effects in the cementing formulation such as excessive cement acceleration, retardation, free water, thickening or thinning, etc. Some cations which provide styrenesulfonic acid salts suitable for use in these copolymers are lithium, potassium, sodium, triethylammonium, tri(hydroxyethyl)ammonium and the like. These cations represent typical examples of appropriate species, but a wide range of cations may be properly used, and the listing of typical cations is in no way intended to limit the scope of the invention.

The copolymers found useful according to this invention for the control of cement fluid loss are further characterized by the so-called reduced viscosity parameter which describes the viscosity which the polymers impart to aqueous solutions. As used herein, this parameter is based on the viscosity of solutions consisting of 2% by weight sodium chloride, 0.5% by weight polymer, and the remainder water. The copolymers of N-vinylpyrrolidone and styrenesulfonic acid salts which are disclosed as part of the subject invention are those having a reduced viscosity of from 0.5 to 15 dl/g.

This invention also discloses a means for controlling the fluid loss to permeable earth formations and from formulations used in the cementing of subterranean wells, particularly those wells drilled for the production of oil and gas, by use of the copolymers discussed above and subsequently detailed as the highly useful specific polymer in Example 1. The amount of the copolymer mixture utilized in a cement formulation will vary with the particular borehole environment at hand. Geological formation characteristics, borehole properties, borehole depth, contaminants, temperatures and pressures encountered, cement type and other additives, and purpose and method of application of the cementing operation will influence the determination of quantities of the copolymers in the mixtures of this invention to be used in a particular cement formulation to achieve the desired effect. In addition the particular properties of the copolymer mixture will influence the determination of quantities to be used. Because of these factors, it is impossible to specifically state nominal usage levels under all environments or conditions. Those skilled in the art of subterranean well cementing will be able to easily determine needed quantities of the copolymers and dispersant(s) in the mixtures for cement fluid loss control by testing formation characteristics, formation temperatures and pressures, and cement formulation characteristics, and by otherwise assessing the fluid loss characteristics required of the cement formulation. Nevertheless, it can be stated that a treatment rate of 0.2% to 5% (by weight based on dry cement weight) of the mixture should be appropriate. It is possible that under some circumstances as little as 0.05% or as much as 10% of the mixture would be required.

The dispersants useful in the copolymer mixture are low to medium molecular weight sulfonated polymers such as condensed formaldehyde lignosulfonate, formaldehyde sulfonate, and condensed naphthalenesulfonates. The preferred salt is calcium, although any metal salt can be used. The dispersant and copolymer can be used in any ratio in order for beneficial effects to be observed in the cement formulation although preferred ratios range from 10:1 to 1:10 with about a ratio of 3:1 to 1:3 being optimal. Blending of the dispersant-copolymer mixture prior to introduction into the slurry or to the dry cement is easily carried out by known mixing procedures for handling dry powders or if the copolymer is in an aqueous solution, the dispersant is readily stirred into the solution.

The oil well cements employed in the instant invention are API classification cements—A, B, C, D, E, F, G, and H, pozzalanic cements, pozzolan-lime cements, resin or plastic cements, gypsum cements, diesel oil cements, expanding cements such as API classification cements K and M, calcium aluminate cements, and latex cements.

The copolymer-dispersant mixture prepared and used according to this invention may be added to the cement slurry in a variety of ways. It may be applied in a solid form, including being premixed with the cement before it is added to water or the dry polymer-dispersant mixture may be added to the cement water slurry or individually admixed with the dry cement or slurry. Alternatively, the copolymers and dispersants may be applied as aqueous solutions to the dry cement or cement slurry. In the latter cases the water included in the copolymer solution replaces an equal amount of water normally included in the cement slurry. The dry mixture usually contains from 0.01 to 100, preferably 0.1 to 10, optimally 0.3 to 3.0 parts by weight of the copolymer of N-vinylpyrrolidone per part by weight of the sale of condensed formaldehyde naphthalene sulfonic acid (usually the calcium salt).

The amounts of water and cement contained in the subject cementing compositions which include the copolymers of N-vinylpyrrolidone and styrenesulfonate salts are highly dependent on the type of cement being used, the other additives being used in the cementing formulation, the borehole conditions and the techniques being used to apply the cement formulation to the borehole. Those skilled in the art of borehole cementing will by consideration of these factors be able to determine the proper cement slurry formulation which will maximize benefits from inclusion of the mixtures of this invention.

A variety of other additives may be used in a cement formulation treated with the copolymers of this invention. For example, cement hardening retarders, hardening accelerators, materials to lower or raise the density of the slurry, lost circulation-control agents, friction reducers, stabilizers for high temperature strength, etc. may all be used together with this polymer. This list of formulation ingredients which might accompany the polymer of this invention in a cement slurry is meant to be exemplary, but in no way are the accompanying materials limited to those mentioned herein. These and other cement additives may be combined with the subject mixtures as it is determined appropriate by workers skilled in the well cementing art.

The copolymer cement formulations and processes described herein as embodiments of the subject invention represent substantial improvements to the art of subterranean well cementing. As compared to the materials and methods known previously for the control of fluid loss in well cementing formulations, use of the subject copolymer-dispersant mixtures are advantageous in several respects. Unlike many of the previously known fluid loss agents, the copolymer described herein is shown to possess a synergistic relationship with the dispersants accompanying it in the subject mixtures, above and beyond the additive effects displayed by either copolymer or dispersant alone in filtration control activity. The copolymer-dispersant mixtures have the remarkable thermal stability of their components and provide excellent fluid loss control at temperatures greater than 95° C. without many of the undesirable side effects common to other cement fluid loss control agents. The copolymer-dispersant mixtures cause little thickening of the cement slurry, little retardation of the cement thickening, and no increase in free water. Thus, these mixtures represent a broadly applicable, general purpose cement fluid loss control treatment, of the type needed for the difficult cementing environments more and more commonly encountered in today's well drilling situations.

The following examples will further illustrate the novel qualities of the additive compositions and processes of the present invention without in any way limiting the scope of this invention.

EXAMPLE 1

Synthesis of copolymers of sodium styrenesulfonate (SSS) and N-vinylpyrrolidone (NVP)

Copolymer (PD860-29.2)

In a flask, to 300 ml of distilled water, purged with $N_2$ for 1 hour at 60° C., freshly distilled N-vinylpyrrolidone (NVP) 7.748 g and sodium styrenesulfonate (SSS) 42.26 g were added and dissolved. After sparging the solution with $N_2$ for an additional 1 hour, 0.10 g of a azoisobutyronitrile (AZBN) was added.

The solution became thick during 20 hours at 60° C. The resulting copolymer was purified by precipitation from a large volume of acetone.

Yield: 72.1% (based on weight of monomers). Copolymer composition: NVP/SSS=15.3/84.7 mol/mol. Reduced viscosity: 3.6 dl/g at 0.42% in 2% NaCl aqueous solution.

EXAMPLES 2-9

These examples demonstrate the fluid loss control activity of the subject copolymer-dispersant mixture as a cement filtration control agent at temperatures ranging from from 30° to 79° C.

For comparison, the results of the use individually of the copolymer (PD860-29.2) and the preferred dispersant (the calcium salt of condensed naphthalenesulfonate) are set forth to demonstrate the synergistic results of the mixture as a cement fluid loss control additive at 30° C.

For each test sample, 860 g of API Class H cement (Lone Star Industries; Pasadena, Tex.), and 327 g of tap water and 0.3 g of silicone defoamer were mixed at high speed (12,000 rpm) in a 1 qt capacity Waring Blender for 35 seconds. Then 7.14 g (0.6% based on total slurry weight and 100% active polymer) of candidate fluid loss control material was added, and the slurry was aged at 30° C. in an atmospheric cement consistometer at which time a consistency value (Bauden units) was recorded with a value ranging from 9-15 desired.

For measurement of fluid loss, the slurry was transferred to a Baroid High Pressure Filter Press (Model 311, NL Baroid/NL Industries, Inc., Houston, Tex.). The fluid loss was measured according to API Specification 10, Appendix F (1982) at 1,000 psi differential pressure and at temperatures ranging from 30° to 79° C.

Recorded results were corrected to represent filtration through the standard 7.1 sq in filtration area by multiplying the reading obtained by 2.0.

The results obtained were as follows:

TABLE 1

| Example | Use rate of Copolymer PD860 29.2 % of Dry Cement | Use Rate of Dispersant* % of Dry Cement wt. | Filtrate ml. in 30 Min. | Consistency (Bauden Units) |
|---|---|---|---|---|
| Tested at 30° C. | | | | |
| 2 | 0.6 | — | 180 | 15 |
| 3 | 0.6 | 0.3 | 64 | 10 |
| 4 | 0.6 | 0.6 | 31 | 9 |
| 5 | — | 0.6 | 348 | 9 |
| 6 | — | — | 3000+ | 11 |
| Tested at 60° C. | | | | |
| 7 | 0.6 | — | 568 | 13 |
| 8 | 0.6 | 0.6 | 60 | 9 |
| Tested at 79° C. | | | | |
| 9 | 0.6 | 0.6 | 120 | 6 |

*Commercially sold as Lomar D by Diamond-Shamrock, Morristown, NJ and believed to be the sodium salt of formaldehyde condensed naphthalenesulfonic acid.

It is clear from the results data that a particular NVP/SSS copolymer in which the molar ratio of NVP to SSS was about 7:3 in admixture with a condensed naphthalenesulfonate calcium salt optimally at a weight ratio range of about 1:1 provides an exceptional decrease of fluid loss (at 30° C., 1.2 wt.% of the mixture reduced fluid loss from the cement to 31 ml/30 minutes as from Example 3 of the Table).

What is claimed is:

1. An aqueous slurry which consists essentially of:
   (a) a cement;
   (b) about 0.05 to 5.0 wt% of a copolymer of N-vinylpyrrolidone and a salt of styrenesulfonic acid and based on the dry weight of said cement;
   (c) about 0.05 to 5.0 wt% of a dispersant of a metal salt of formaldehyde condensed naphthalenesulfonic acid base on the dry weight of said cement the ratio of said copolymer to dispersant ranging from 3:1 to 1:3 by weight; and
   (d) water, said cement, said copolymer and said dispersant being dispersed in said water to form said aqueous slurry and said wt% being based on the total weight of said slurry.

2. A slurry according to claim 1, wherein said copolymer has about 35 to about 90 mole % of N-vinylpyrrolidone.

3. A slurry according to claim 2, wherein said salt of said styrenesulfonic acid is water soluble.

4. The slurry of claim 1 wherein the copolymer has about 35 to about 90 mole percent of N-vinylpyrrolidone.

5. The slurry of claim 1 wherein the dispersant is a salt of styrene sulfonic acid and a metal salt of formaldehyde condensed naphthalenesulfonic acid.

* * * * *